US010372684B2

(12) United States Patent
Lord

(10) Patent No.: US 10,372,684 B2
(45) Date of Patent: Aug. 6, 2019

(54) METADATA PEERING WITH IMPROVED INODES

(71) Applicant: Quantum Corporation, San Jose, CA (US)

(72) Inventor: Stephen Lord, Prior Lake, MN (US)

(73) Assignee: Quantum Corporation, San Jose, CA (US)

( * ) Notice: Subject to any disclaimer, the term of this patent is extended or adjusted under 35 U.S.C. 154(b) by 888 days.

(21) Appl. No.: 14/593,022

(22) Filed: Jan. 9, 2015

(65) Prior Publication Data

US 2016/0203203 A1 Jul. 14, 2016

(51) Int. Cl.
*G06F 17/30* (2006.01)
*G06F 16/178* (2019.01)

(52) U.S. Cl.
CPC .................. *G06F 16/1787* (2019.01)

(58) Field of Classification Search
CPC ......... G06F 17/30176; G06F 17/30581; G06F 17/30165; G06F 16/1787
See application file for complete search history.

(56) References Cited

U.S. PATENT DOCUMENTS

| 9,223,799 | B1* | 12/2015 | Veeraswamy | G06F 16/188 |
| 2003/0182328 | A1* | 9/2003 | Paquette | G06F 16/27 |
| 2010/0169466 | A1* | 7/2010 | Atluri | G06F 16/10 709/220 |
| 2010/0217771 | A1* | 8/2010 | Nash | G06F 16/954 707/769 |
| 2010/0332454 | A1* | 12/2010 | Prahlad | G06F 16/1844 707/654 |
| 2011/0055621 | A1* | 3/2011 | Mandagere | G06F 11/1435 714/6.3 |
| 2012/0066333 | A1* | 3/2012 | Browning | G06F 9/541 709/212 |
| 2013/0325804 | A1* | 12/2013 | Bachar | G06F 16/1847 707/634 |
| 2014/0258242 | A1* | 9/2014 | Kanfi | G06F 17/30091 707/690 |

* cited by examiner

*Primary Examiner* — Huawen A Peng
(74) *Attorney, Agent, or Firm* — Eschweiler & Potashnik, LLC

(57) ABSTRACT

Example apparatus and methods concern metadata peering that allows a file system to address a file in a local namespace while actually accessing the file using an address used by a shared secondary storage. This allows the file system to operate unmodified and more efficiently in a native mode that addresses files in the shared secondary storage using addresses local to a computer running the file system. An example method accesses an inode associated with a file that is stored in a shared secondary storage. The method accesses a local namespace identifier used by the file system to access the file and accesses a reference used by the shared secondary storage to access the file. The reference is not associated with the local namespace. The method stores an opaque value in the inode. The opaque value facilitates accessing the file in the shared secondary storage using the local namespace.

13 Claims, 10 Drawing Sheets

METADATA PEERING WITH IMPROVED INODES

BACKGROUND

A file system (FS) store files and stores information about files. The information stored in files may be referred to as data. The information about files may be referred to as metadata. The metadata may include, for example, a file name, a file size, a file parent, a file descendant, a file access time, a file owner, file permissions, an address where the file can be found, and other information. Some of the metadata for an individual file may be stored in a data structure known as an inode. An inode may provide a connection between a logical space associated with the FS and physical hardware that supports the FS. The inodes and metadata for a file system may also be stored collectively. The metadata has both structure and content. When the data in a file or about a file changes, an FS may want to update the metadata about that file. For example, if the contents of a file are changed, the FS may want to memorialize the time at which the change was made and by whom the change was made. Actions on a file produce actions on a corresponding inode. Inode is used herein in its computer science and operating system usage.

An FS may experience an action that affects a member of its collection of files. The action may be recorded in a transaction. For example, a transaction may be generated when a file is created, accessed, updated, or deleted. FS metadata and transactions that affect the FS may be recorded or otherwise preserved for the FS. To mitigate issues associated with an error on the machine on which the FS is running or with a process associated with the FS, the metadata or transaction may be stored on a separate device or in a separate memory or database. For example, an FS may cause FS metadata to be sent to a storage manager, metadata manager, metadata dump, or other location. Additionally, the FS may cause a stream of FS transactions to be sent to a data store (e.g., updates database) that stores FS transactions. In one embodiment, the stream of FS transactions may arrive at the updates database indirectly through the metadata manager. The metadata and FS transactions may include inode information including, for example, information that resolves to an actual disk address at which the file may be accessed. When an inode provides information that resolves to an actual disk address, then the inode information may have limited value due to synchronization issues. Independently run file systems may each have their own copy of metadata content. The independently run file systems' own copies of metadata content may reference the same shared copy of file content. Inodes are local to a FS. They are a private resource of a FS. Thus, actions performed on a file in a FS produce actions on a corresponding inode associated with that individual FS. A conventional inode may have a field or fields (e.g., length field, offset field) that resolve to an actual disk address. When the inode resolves to an actual disk address, then the metadata or transactions that are stored off the machine for which the actual disk address is meaningful may be tightly bound to the originating FS and to the actual disk address. This may complicate the ability to share data between file systems, to create a new FS from an existing file system, or even to recreate or rebuild a new version of an FS from the stored metadata or transactions.

Conventionally, an inode is a data structure that is used to represent a filesystem object. The filesystem object can be one of various things including a file or a directory. Conventional inodes store the attributes and disk block location(s) of the filesystem object's data. Filesystem object attributes may include manipulation metadata (e.g., change, access, modify time), as well as owner and permission data (e.g., group-id, user-id, permissions).

Originally, an FS stored and organized data for a single operating system or machine. The files associated with the FS may have been stored on a tape, on a disk (e.g., floppy disk, hard disk), or on another device local to the machine on which the FS ran. In the early days of computing when operating systems and file systems were being developed, there were no networks, no shared memory, and no shared devices. Therefore, file systems developed from the point of view of a single observer and user. The inode therefore also developed from the point of view of a single user and single device that had its own local, dedicated storage. This paradigm of a single user, a single FS, and a single device with dedicated local storage led to file systems using local namespaces exclusively and storing actual addresses in inodes. Namespace, as used herein, refers to its usage in computer science where a namespace is considered to be a container for a set of identifiers. The identifiers may also be known as symbols or names. A namespace provides a level of direction to specific identifiers which makes it possible to distinguish between identifiers with the same name. As networks and shared memory and shared storage devices were created and proliferated, shortcomings in the inodes associated with the single user, single FS, single device paradigm emerged.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Prior Art

Prior Art

Prior Art

DETAILED DESCRIPTION

Independently run file systems may each have their own copy of metadata content. The independently run file systems' own copies of metadata content may reference the same shared copy of file content. Metadata peering exists when the metadata of the independently run file systems is exchanged between the file systems. Exchanging the metadata allows the users of the two file systems to exchange access to the shared data copy. Example apparatus and methods concern metadata peering through inode improvements that store an opaque value or data reference in an inode instead of storing values (e.g., offset, length) that resolve to an actual disk address. The opaque value or reference may resolve to a logical location in a shared secondary storage. In one embodiment, the shared secondary storage may be referred to as a "cloud." The cloud may store data using a plurality of disks, a plurality of tapes, a plurality of solid state devices (SSD), or other data stores. Storing the opaque value or reference to a shared secondary storage in the inode instead of storing an offset and length that resolve to an actual disk address facilitates creating, updating, removing, or operating on files that are relevant to (e.g., shared by) a plurality of file systems without producing a complicated or even intractable mapping issue.

Metadata peering facilitates have multiple independent file systems that share content (e.g., files) in a more efficient manner. While each file system may perceive that it is interacting with the "real" content using its own local namespace, that content may actually be stored once in the shared secondary storage (e.g., cloud) instead of being stored once for each file system on a disk that is local to each file system. Since there is only a single copy of the content, no central arbiter of which file system has the "real" (e.g., most up-to-date) content is required. Example apparatus and methods facilitate having a file system (FS) maintain its own namespace and its own views into data while improving that file system's ability to share data. Example apparatus and methods facilitate having a local FS create, update, or remove inodes in terms of a source target space rather than in terms of their own namespace and view, even while allowing the FS to use its own namespace and local view of data.

Figure 1:
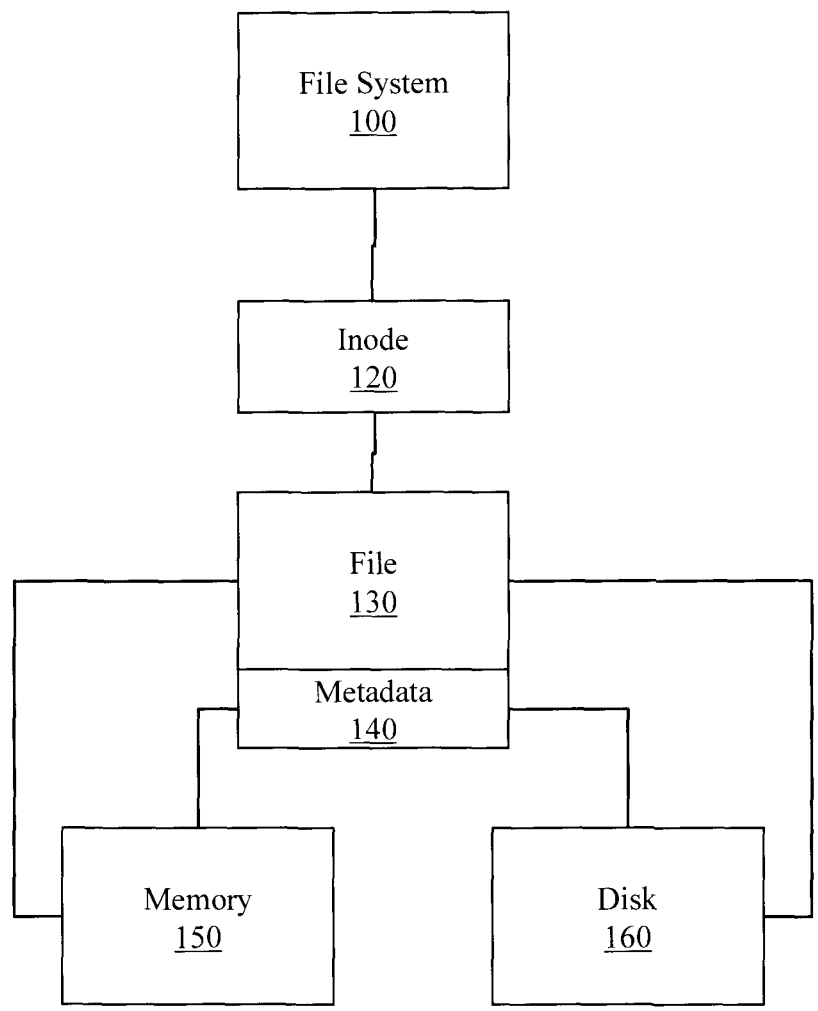
FIG. 1 illustrates a file system.

FIG. 1 illustrates a file system 100. While a user may refer to a file 130 using a file name, the file system 100 may refer to the file 130 using an inode 120. When a change is made to the file 130, there may also be a change to the metadata 140 associated with the file. The metadata 140 may include, for example, the name of a file, the size of a file, the owner of a file, the most recent access time of a file, and other information. In some occurrences, the updated file 130 may be stored in memory 150. Similarly, in some occurrences, the updated metadata 140 may be stored in memory 150. When a local disk is used, the updated file 130 and the updated metadata 140 may ultimately be moved from memory 150 to disk 160. While there are changes that have only been made in memory 150, a journal or other data store may be used to protect those changes. In one embodiment, some of the metadata 140 for a file 130 may be stored in the inode 120 associated with the file 130. The inode 120 may also store association metadata (e.g., parent, child) for a file. The association metadata may describe, for example, a parent (e.g., directory) for a file or a descendant (e.g., sub-directory, file) for a directory. The inodes and metadata may be stored in data structures about the files. Thus, file system 100 may have both files and data structures about those files. Example apparatus and methods store different information in inode 120 than conventional file systems.

Figure 2:
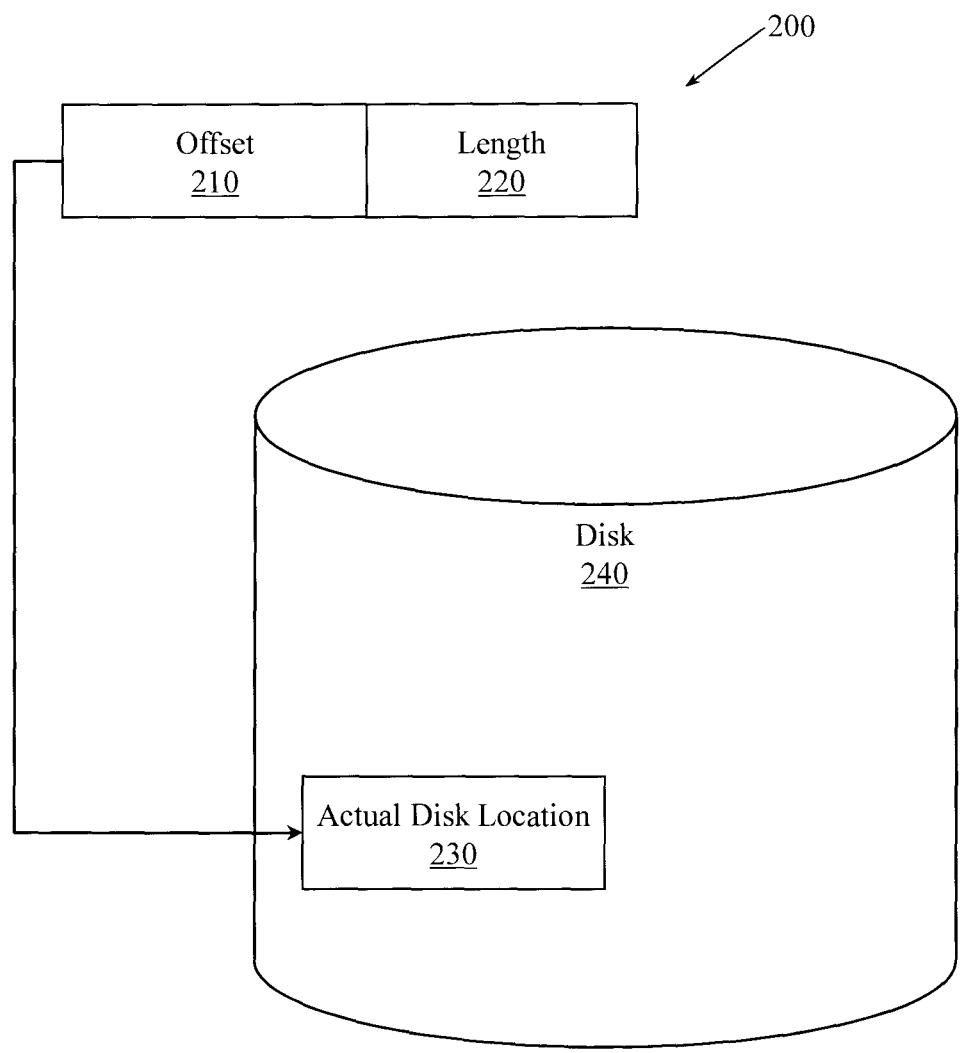
FIG. 2 illustrates a conventional inode resolving to an actual disk address.

Prior Art FIG. 2 illustrates a conventional inode 200. The conventional inode 200 has two fields (e.g., offset 210, length 220) that resolve to an actual disk location 230 on a local disk 240. Conventional inode 200 may have other fields that are not illustrated that are not involved in locating the file with which inode 200 is associated. While an offset 210 and length 220 are illustrated, a conventional inode may have a number of other fields that are associated with locating a file. While a disk location 230 and a disk 240 are illustrated, conventional inode 200 may store information that resolves to another physical address (e.g., tape location) on another type of physical device (e.g., tape). Regardless of the number or types of fields, and regardless of the type of physical device, conventional inode 200 uses information stored in inode 200 to find an actual physical storage location (e.g., disk location 230) on an actual physical storage device (e.g., disk 240).

Figure 3:
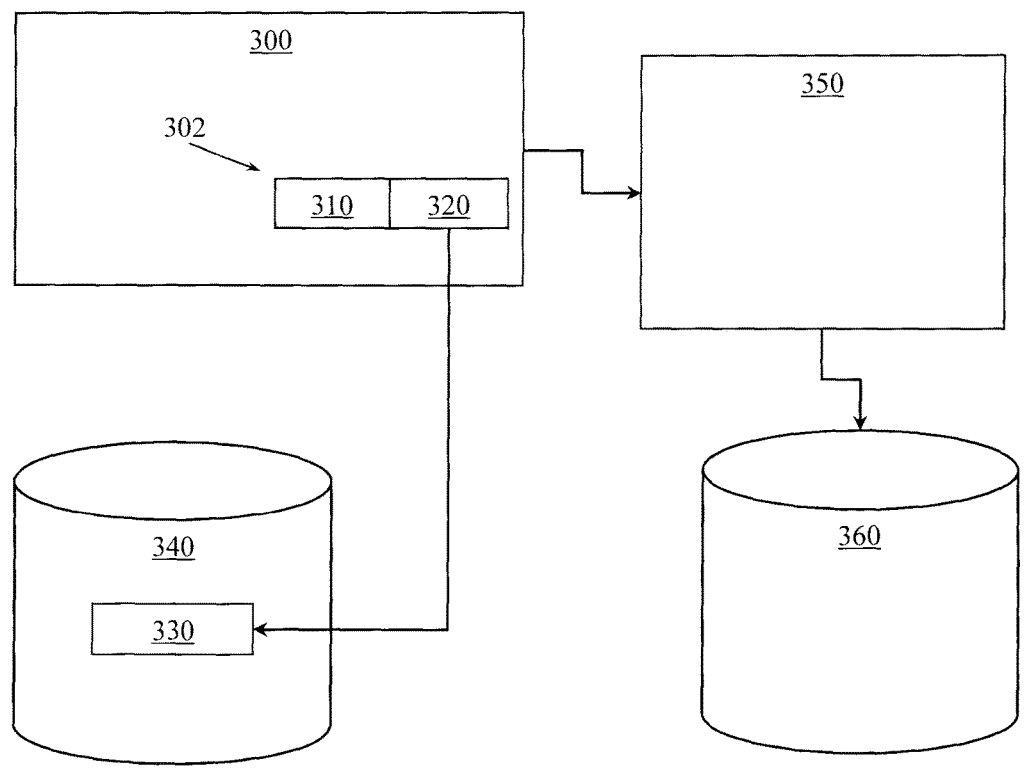
FIG. 3 illustrates a file system and a conventional inode.

Prior Art FIG. 3 illustrates a file system 300 and a conventional inode 302 that includes an offset 310 and length 320 that resolve to an actual disk location 330 on a local disk 340. The file system 300 may communicate metadata or transactions to a metadata manager 350 or other data store. The metadata manager 350 may cause a stream of transactions associated with FS 300 to be provided to an updates database 360 or other data store. The updates database 360 is a persistent capture of changes to FS 300. The metadata provided to the metadata manager 350 may include the offset 310 and length 320 that resolve to actual disk location 330. The information associated with the actual disk location 330 stored in the metadata manager 350 and the updates database 360 may suffer from or produce synchronization issues that may make it difficult, if even possible at all, to have a large number of file systems efficiently share data.

One synchronization issue may arise, at least in part, because FS 300 has its own local namespace and own local view of the data with which it interacts. This local namespace and local view are relevant to FS 300, but may be irrelevant to other file systems. The information in inode 302 may be relevant only to that local namespace and local view. One use of the information in metadata manager 350 and updates database 360 is to rebuild FS 300 if the primary copy of FS 300 is damaged or destroyed. Another use of the information in metadata manager 350 and updates database 360 is to build another FS. While it may be possible to recreate FS 300 or to create a new FS from the information in metadata manager 350 and updates database 360, the synchronization issues associated with the local namespace and with the inode 302 resolving to an actual disk location may complicate this process.

Figure 4:
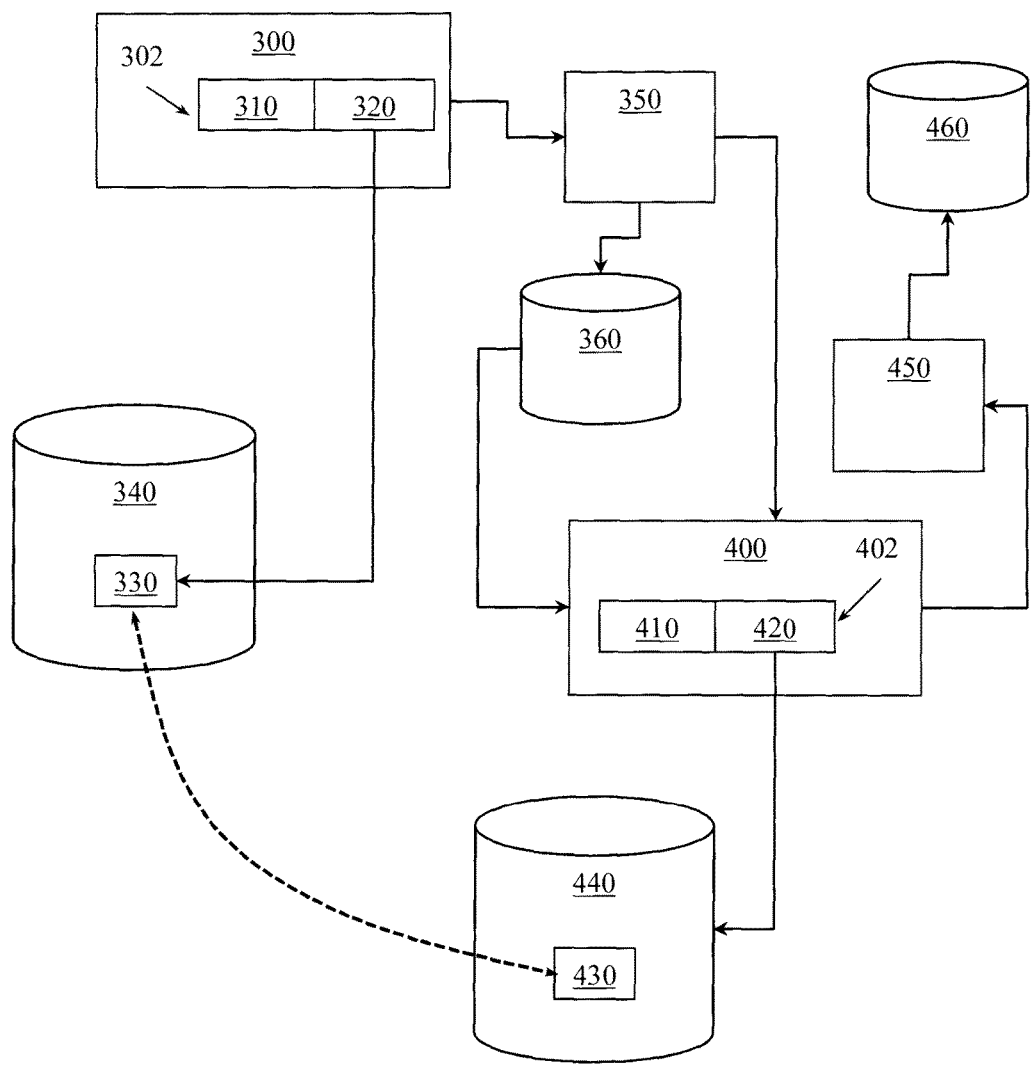
FIG. 4 illustrates a file system and a conventional inode.

Prior Art FIG. 4 illustrates file system 300 and a conventional inode 302 and creating a new FS 400 from information in the metadata manager 350 and updates database 360. Like FS 300, FS 400 also uses an inode 402 that has an offset 410 and a length 420 that resolve to an actual disk location 430 on a local disk 440. FS 300 may store its copy of shared data at location 330 and FS 400 may store its copy of the shared data at location 430. Complexity associated with synchronization arises when FS 300 considers the data at location 330 on disk 340 to be the "real" data while FS 400 considers the data at location 430 on disk 440 to be the "real" data. The complexity may require another actor or process to keep track of whether the data at location 330 is the most up-to-date data or whether the data at location 430 is the most up-to-date data. If both FS 300 and FS 400 seek to change the shared data, then race conditions and other issues may arise.

Like FS 300 interacts with its own metadata manager 350 and updates database 360, FS 400 interacts with its own metadata manager 450 and updates database 460. Like FS 300, FS 400 has its own namespace and its own view about data with which it interacts. The namespace associated with FS 300 and the namespace associated with FS 400 may be completely different, unrelated, or incompatible. Information about the actual disk location 430 will be propagated to metadata manager 450 and updates database 460. FS 400 will have its own synchronization issues with actual disk location 430, metadata manager 450 and updates database 460. FS 300 will have its own synchronization issues with actual disk location 330, metadata manager 350, and updates database 360.

The combination of FS 300 and FS 400 will have additional synchronization issues associated with trying to share data when there are multiple copies of the data, multiple inodes associated with the data, and multiple sets of metadata or transactions associated with the multiple copies of the data. The additional synchronization issue may concern identifying which actual disk location has the "real" data that is being shared. The complexity of the additional synchronization issues may increase exponentially as additional file systems try to share data with FS 300 and FS 400. At some point, the computer processor cycles spent trying to maintain synchronization between multiple copies of shared data, including resolving multiple different mappings associated with multiple different local namespaces, may create inefficiencies that negatively impact computer performance. Example apparatus and methods produce a technical effect of improving efficiency in the operation of file systems that share data. Synchronization issues will be reduced and thus the computers running file systems that share data will operate faster and more efficiently.

Figure 5:
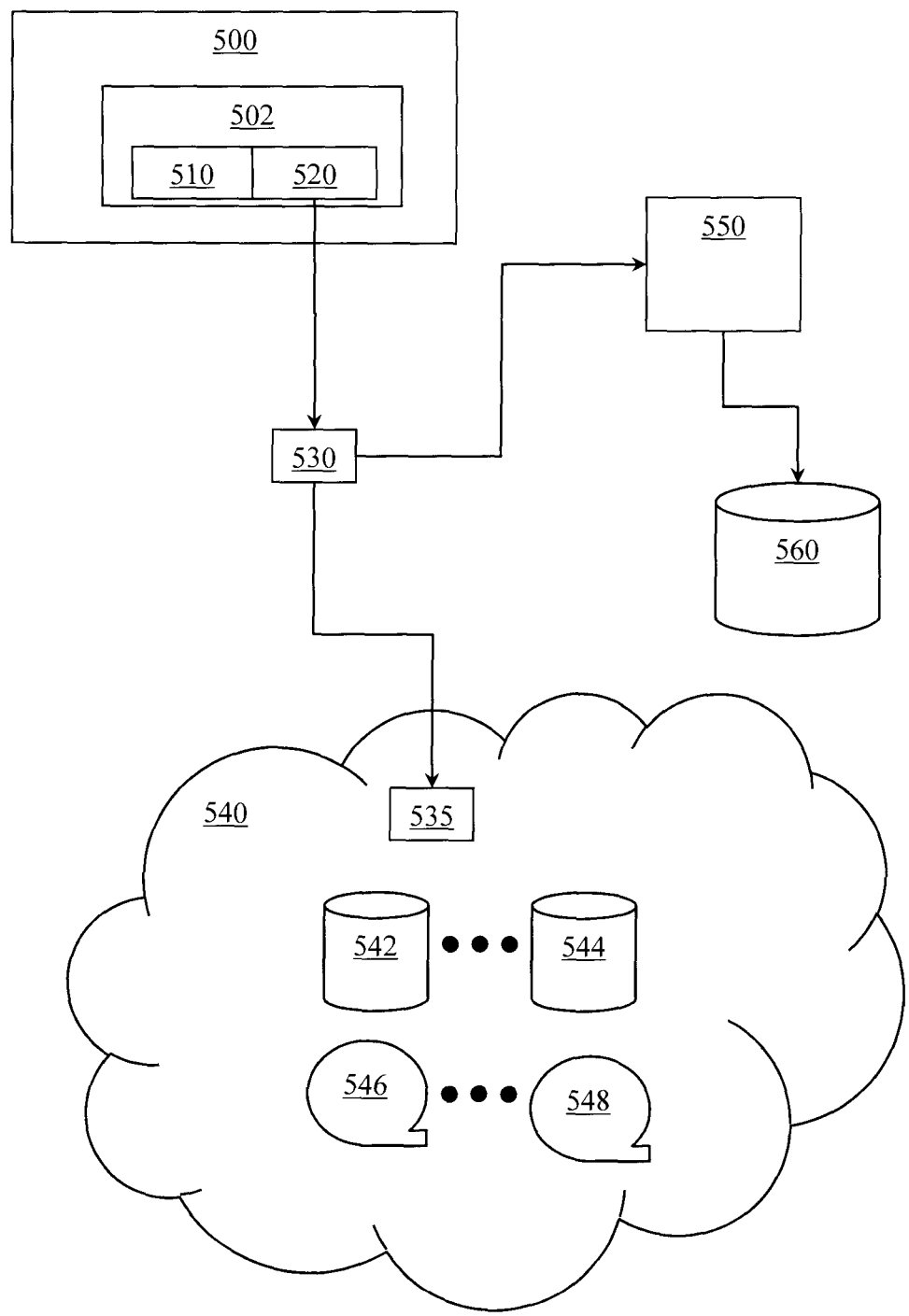
FIG. 5 illustrates a file system and an example inode.

FIG. 5 illustrates a file system 500 interacting with an example inode 502 that has values 510 and 520 that do not resolve to an actual disk location. Instead of resolving to an actual disk location, values 510 and 520 may be associated with a reference 530 that may be an opaque value rather than a physical disk address. While values 510 and 520 are illustrated as separate values, inode 502 may have a greater or lesser number of values that represent an opaque value that is an indirect reference to a location. The reference 530 may resolve or map to a location 535 in shared secondary storage 540. Shared secondary storage 540 may be referred to as "the cloud." Shared secondary storage 540 may include a plurality of disk drives (e.g., 542 . . . 544), a plurality of tape drives (e.g., 546 . . . 548), or a plurality of other data stores (e.g., solid state devices). File system 500 may still have its own local namespace and its own local view about its data, but inode 502 may provide an indirect reference 530 to a logical location 535 instead of direct access to an actual disk address.

File system 500 may interact with a metadata manager 550 and an updates database 560. While a metadata manager 550 and an updates database 560 are described, more generally, FS 500 may store metadata in an external data store and may store transactions in an external data store. Unlike a conventional system, FS 500 may not cause an actual disk address to be propagated into the metadata manager 550 and the updates database 560. Instead, FS 500 may cause reference 530 to be propagated to the metadata manager 550 and the updates database 560. This may mitigate synchronization issues for FS 500 since only a single copy of data may be stored, and that single copy may be accessible to multiple file systems without requiring resolving local namespace differences between the file systems.

Figure 6:
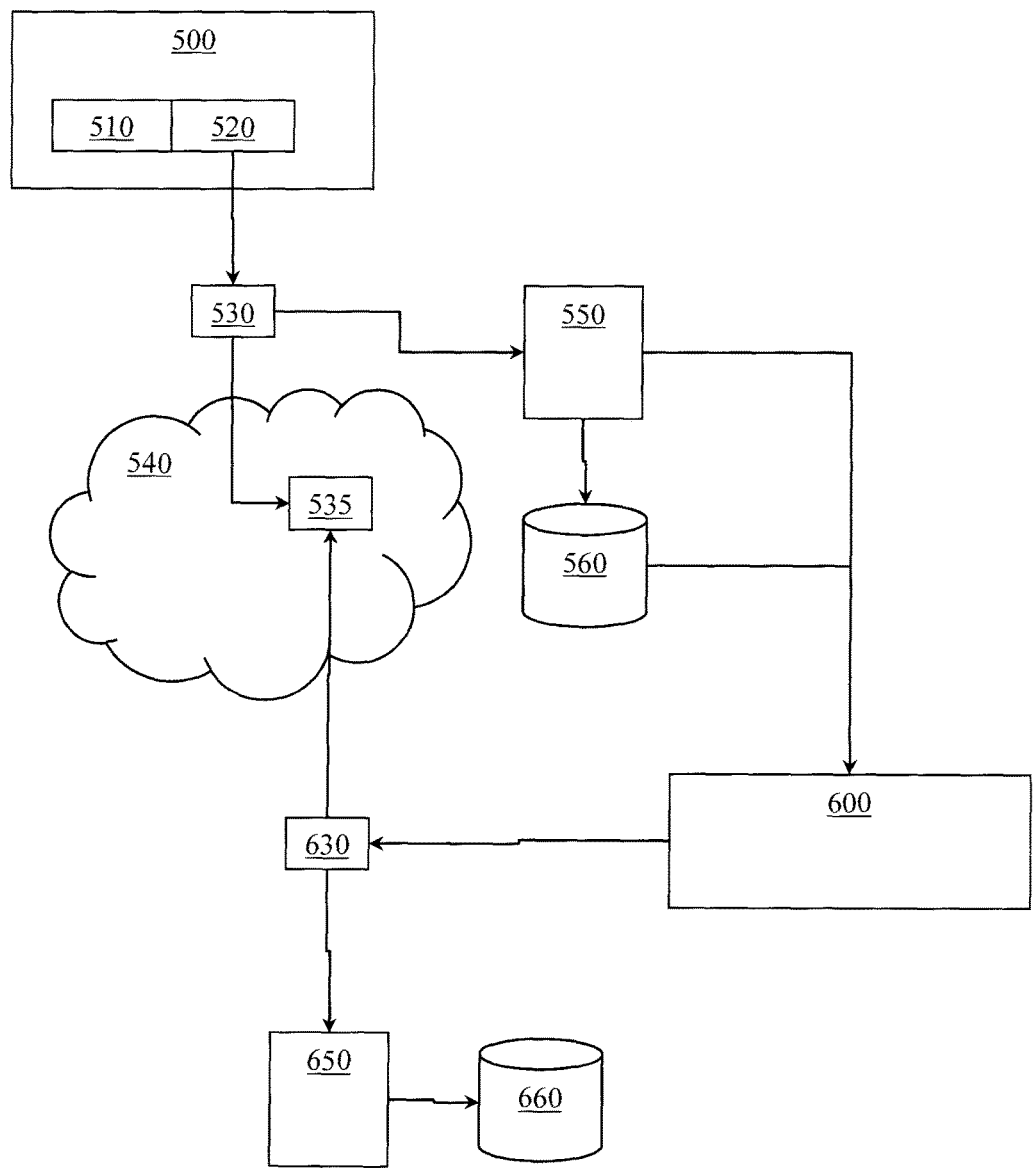
FIG. 6 illustrates a file system and an example inode.

FIG. 6 illustrates file system 600 being created from information associated with metadata manager 550 and updates database 560. More generally, FS 600 may be created from metadata and transactions associated with FS 500. FS 600 will have its own namespace and its own view of its data. FS 600 will also interact with its own metadata manager 650 and its own updates database 660. More generally, FS 600 will store metadata and transactions in its own data stores. Like FS 500, FS 600 will use an example inode that does not store an actual address for a piece of shared content (e.g., file) but instead stores information associated with a reference 630 or opaque value that indirectly leads to location 535 in shared secondary storage 540. Rather than each FS storing its own local copy of the data to be shared by the file systems, which produces synchronization issues, there is a single copy of the data to be shared and that data is stored in shared secondary storage 540 (e.g., the cloud). Reference 530 and reference 630 both lead to location 535 in shared secondary storage 540. This mitigates or even eliminates synchronization issues associated with conventional systems.

FS 500 and FS 600 are two separate file systems. They are not a single FS. They do not employ a central arbiter to resolve which local disk has the "real" data because there is only a single copy of the data and that data is stored in shared secondary storage 540. While each FS has its own namespace, each FS also has access to shared location 535 in shared secondary storage 540 via their own reference to the location. Each FS may need to map from its local namespace to the reference, but different file systems will not need to map from their local namespace to some other file system's namespace. Adding another FS to the scenario illustrated in FIG. 6 does not exponentially increase the complexity like in conventional systems. Another FS added to the scenario illustrated in FIG. 6 would only need its own inode that also has a reference that can be used to access location 535. The local namespace for the additional FS would not increase the complexity for either FS 500 or FS 600. Overall complexity would only increase linearly.

Some portions of the detailed descriptions herein are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated. The physical manipulations create a concrete, tangible, useful, real-world result.

It has proven convenient at times, principally for reasons of common usage, to refer to these signals as bits, values, elements, symbols, characters, terms, or numbers. It should be borne in mind, however, that these and similar terms are to be associated with the appropriate physical quantities and are merely convenient labels applied to these quantities. Unless specifically stated otherwise, it is to be appreciated that throughout the description, terms including processing, computing, and determining refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders or concurrently with other blocks from that shown and described. Moreover, less than all the illustrated blocks may be required to implement an example methodology. Blocks may be combined or separated into multiple components. Furthermore, additional or alternative methodologies can employ additional, not illustrated blocks.

Figure 7:
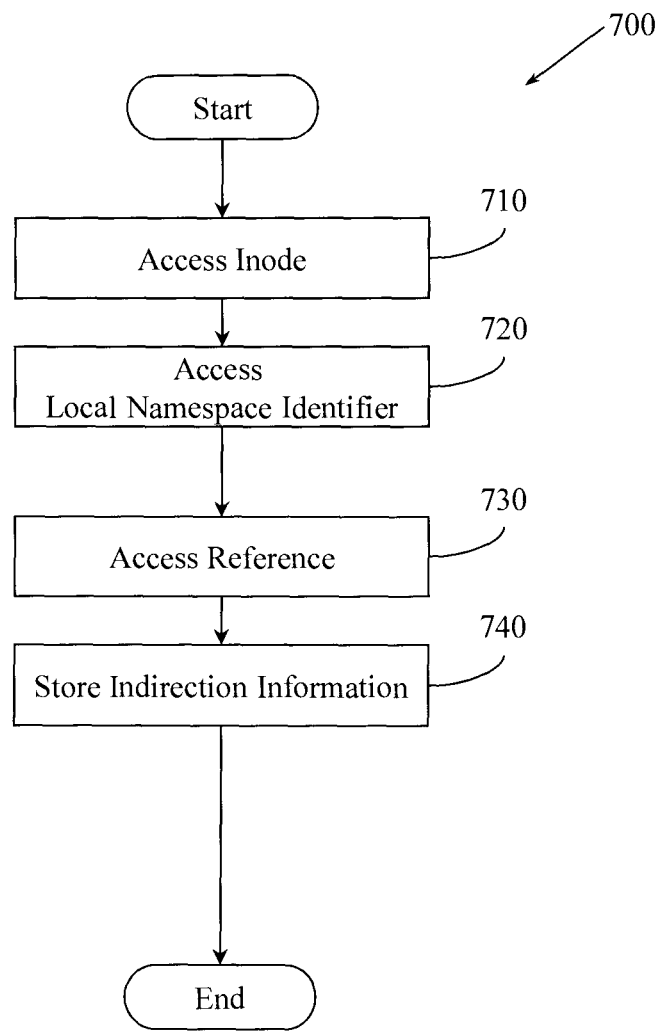
FIG. 7 illustrates an example method associated with metadata peering.

FIG. 7 illustrates a method 700 associated with metadata peering. Metadata peering allows two different file systems to efficiently share information about files stored in the cloud and mitigates synchronization issues associated with conventional systems. Method 700 includes, at 710, accessing an inode associated with a file in a file system. The file is actually stored in a shared secondary storage (e.g., in the cloud). Accessing the inode may include reading from a computer memory, reading from a file, or other computer related activity. An inode is a collection of electronic data that cannot be read, processed, or even perceived by a human. Similarly, an inode cannot be processed by pen or paper or any mental steps, since an inode is a collection of electronic data. While information in an inode may be susceptible to human comprehension, an actual inode is not. Thus, the claims are limited to dealing with actual inodes, not representations of inodes that may be susceptible to human comprehension.

Method 700 also includes, at 720, accessing a local namespace identifier used by the file system to access the file. The local namespace identifier is associated with a local namespace used by the file system. In one embodiment, the local namespace identifier may resolve to an actual address on a disk, tape, or other data storage device. Thus, in one embodiment, the actual address may include a length plus offset field.

Method 700 also includes, at 730, accessing a reference used by the shared secondary storage to access the file. Unlike the local namespace identifier, the reference is not associated with the local namespace. Thus, two different addresses or pieces of information are accessed: an address or data that is local to the file system and an address or data that is local to the shared secondary storage.

Method 700 also includes, at 740, storing indirection information in the inode. In one embodiment, storing the indirection information in the inode includes storing a first portion of the indirection information in an offset field in the inode and storing a second portion of the indirection information in a length field in the inode. Other embodiments may store the information in other ways depending, for example, on the fields present in the inode. The indirection information facilitates using the reference to access the file in the shared secondary storage even though the file system accessed the file using the local namespace identifier. The information stored in the inode facilitates relating the two different addresses. In one embodiment, the address or data that is local to the file system may be used to identify an inode and then an opaque value from the inode may be used to indirectly arrive at the file in the shared secondary storage. An "opaque" value is a value that is native to neither the local namespace associated with the file system nor the shared secondary storage. Thus, the "opaque" value provides no direct visibility into either system. However, the "opaque" value relates the two different addresses associated with the two disparate systems.

Method 700 facilitates using a file system unmodified in its native mode even while gaining access to shared files stored in shared secondary storage. Having a single version of a shared file in shared secondary storage instead of having multiple copies of the shared file stored locally to each device, mitigates synchronization issues associated with conventional systems. This produces the technical effect of having shared file FSs operate more efficiently because fewer processor cycles, if any, are required to resolve synchronization issues.

Figure 8:
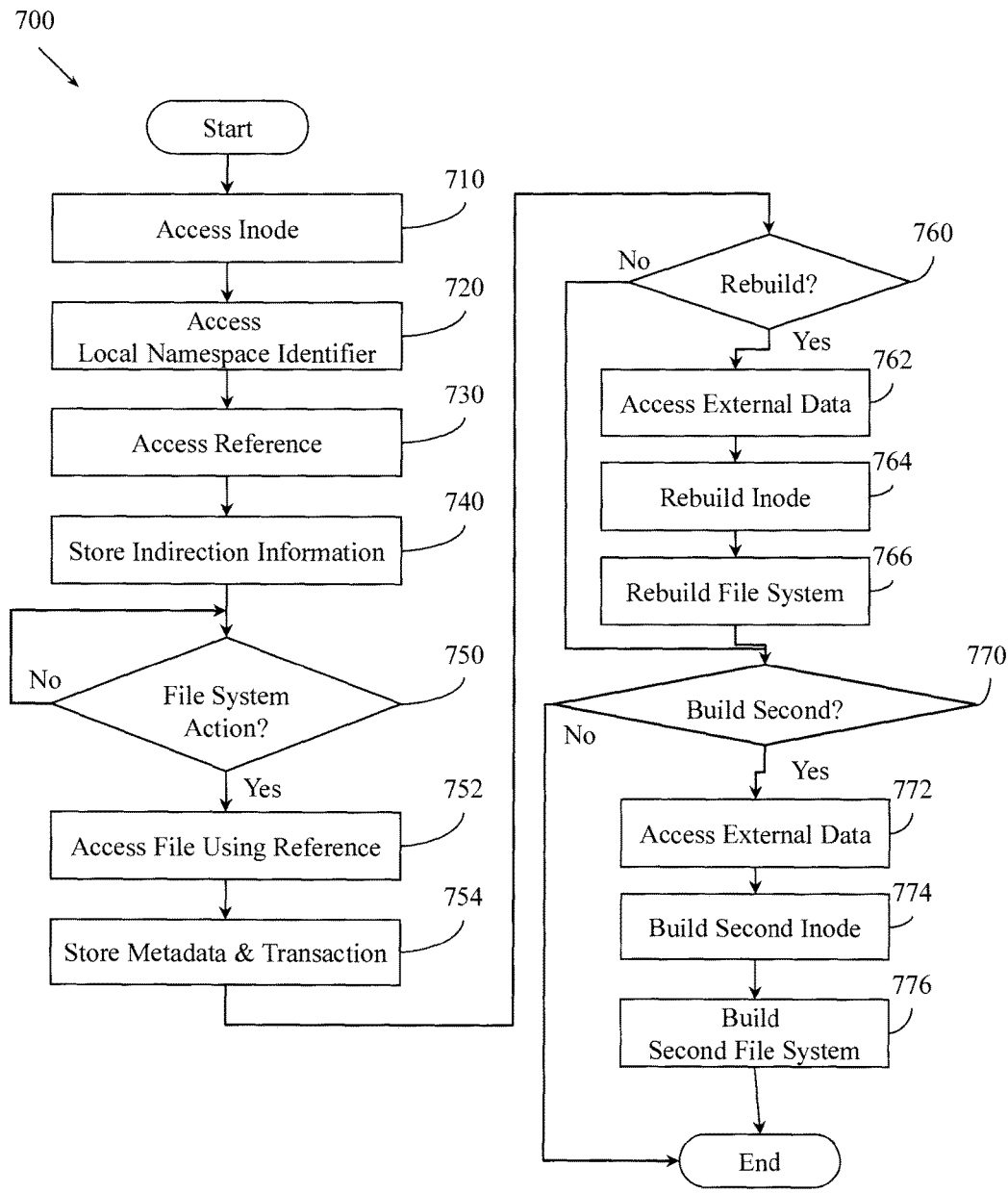
FIG. 8 illustrates an example method associated with metadata peering.

FIG. 8 illustrates another embodiment of method 700. This embodiment also includes, at 750, determining whether there has been a file system action. Upon detecting a file system action associated with the file, where the file system action refers to the file using the local namespace identifier, method 700 will access the file using the reference at 752. Accessing the file using the reference may include accessing the inode using the local namespace identifier, accessing the indirection information in the inode to retrieve the reference, and then accessing the file in the shared secondary storage using the reference.

Since the file being accessed may be a shared file, and since metadata peering concerns making shared files easier and more efficient, actions taken on a file may include causing file system metadata and transaction information to be stored at 754. To mitigate issues with a crash of a computer running a file system, the file system metadata and transaction information may be stored on an external data storage device. Thus, upon detecting a file system action associated with the file, where the file system action refers to the file using the local namespace identifier, method 700 may include, at 754, causing the indirection information in the inode to be placed in a file system metadata and causing the file system metadata to be provided to a metadata data store located on a device separate from a device running the file system. Additionally, method 700 may include, at 754, creating or populating a transaction data structure associated with the file system action, causing the transaction data structure to be placed in the file system metadata, and causing the file system metadata that contains the transaction data structure to be provided to a transaction data store off the device running the file system.

In one embodiment, the file being stored in the shared secondary storage may be a shared file. Thus, method 700 may include detecting a request to access the file from a second, different file system. The second file system may have a second, different namespace that is local to the second file system. Conventionally, complicated mapping that consumed many processor cycles may have been required to handle this request. Example methods may handle the request more efficiently by, for example, accessing a second inode associated with the second file system, accessing a second local namespace identifier to be used by the second file system to access the file, and storing at least a portion of the indirection information in the second inode. Like it did for the inode in the original file system, the indirection information facilitates using the reference to access the file in the shared secondary storage where the file is accessed by the second file system using the second local namespace identifier and the second inode.

The second file system may wish to maintain its own metadata and transactions to facilitate recovery, rebuilding, or other actions. Thus, method 700 may also store metadata or transactions upon detecting a second file system action associated with the file. Recall that the second file system action is associated with the second file system and that the second file system action refers to the file using the second local namespace identifier. In this case, method 700 may include causing the indirection information in the second inode to be placed in a file system metadata associated with the second file system and causing the file system metadata associated with the second file system to be provided to a second metadata data store located off the device running the second file system. Method 700 may also include creating a transaction data structure associated with the second file system action, causing the transaction data structure to be placed in the file system metadata, and causing the file system metadata to be provided to a second transaction data store located off the device running the second file system. In this way, the second file system may have its own repository for file system metadata and transactions. The repository for the second file system may store information using addresses and references associated with a namespace local to the second file system. Unlike conventional systems where complicated mapping between a repository for a first file system and a repository for a second file system were needed, no such mapping is required due to the presence of the opaque values (e.g., indirection information, references) that lead to a single copy of a file on a shared secondary storage.

Sometimes a file system may need to be rebuilt. For example, a storage media holding the file system may lose integrity and thus may no longer be read from reliably. Conventionally, rebuilding the file system may have included accessing file system metadata and transactions that were stored to handle this type of eventuality. However, a conventional system may have only stored information that was local to the processor or process running the file system. In a shared file FS scenario, this may have complicated rebuilding a file system.

Method 700 takes advantage of the file system metadata and transactions that were stored with opaque values, indirection information, or references that facilitate accessing a shared file on a shared secondary storage. Thus, method 700 includes, at 760, detecting a request to rebuild a portion of the file system. When the request is detected, method 700 may, at 762, access external data. Accessing the external data at 762 may include accessing the metadata data store and accessing the transaction data store. Method 700 may then, at 764, create a rebuild inode associated with a selected file in the portion of the file system to be rebuilt. The rebuild inode will receive values from the external data. For example, method 700 may include acquiring rebuild data from the metadata data store or from the transaction data store. The rebuild data includes a recovered local namespace identifier to be used by the file system to access the selected file and a rebuild reference used by the shared secondary storage to access the selected file. With the two different addresses or locating information available, method 700 may then, at 766, rebuild a portion of the file system by storing rebuild indirection information in the rebuild inode. The rebuild indirection information facilitates using the rebuild reference to access the selected file in the shared secondary storage. The selected file may now be accessed by the file system using the recovered local namespace identifier and the rebuild inode.

Sometimes it may be desirable to build another file system from an existing file system. For example, an additional user may want their own view of the file system and may wish to run their own processes on their own processors. Conventionally, building another copy of the file system may have included accessing file system metadata and transactions that were stored to handle this type of eventuality. However, a conventional system may have only stored information that was local to the processor or process running the file system. In a shared file FS scenario, this may have complicated building a second file system from a first, pre-existing file system.

Method 700 takes advantage of the file system metadata and transactions that were stored with opaque values, indirection information, or references that facilitate accessing a shared file on a shared secondary storage. Thus, method 700 includes, at 770, detecting a request to build a portion of a second file system that will share access to the file. When the request is detected, method 700 may, at 772, access external data and then, at 774 build a second inode for the second file system and then, at 776 build the portion of the second file system.

Accessing the external data at 772 may include accessing the metadata data store and accessing the transaction data store. Building the second inode at 774 may include creating a second inode associated with the second file system and acquiring build data from the metadata data store or the transaction data store. The build data that is acquired will include a build reference used by the shared secondary storage to access a selected file. This build reference may then be related to an identifier that is unique or local to the second file system. Therefore, building the second inode at 774 may include creating a build local namespace identifier to be used by the second file system to access the selected file. The build local namespace identifier is associated with a second local namespace associated with the second file system. Finally, building the portion of the second file system at 776 may include storing build indirection information in the second inode. The build indirection information facilitates using the build reference to access the selected file in the shared secondary storage. The selected file may then be accessed by the second file system using the build local namespace identifier and the second inode.

In one example, a method may be implemented as computer executable instructions. Thus, in one example, a computer-readable medium may store computer executable instructions that if executed by a machine (e.g., processor) cause the machine to perform method 700. While executable instructions associated with method 700 are described as being stored on a computer-readable medium, it is to be appreciated that executable instructions associated with other example methods described herein may also be stored on a computer-readable medium.

Figure 9:
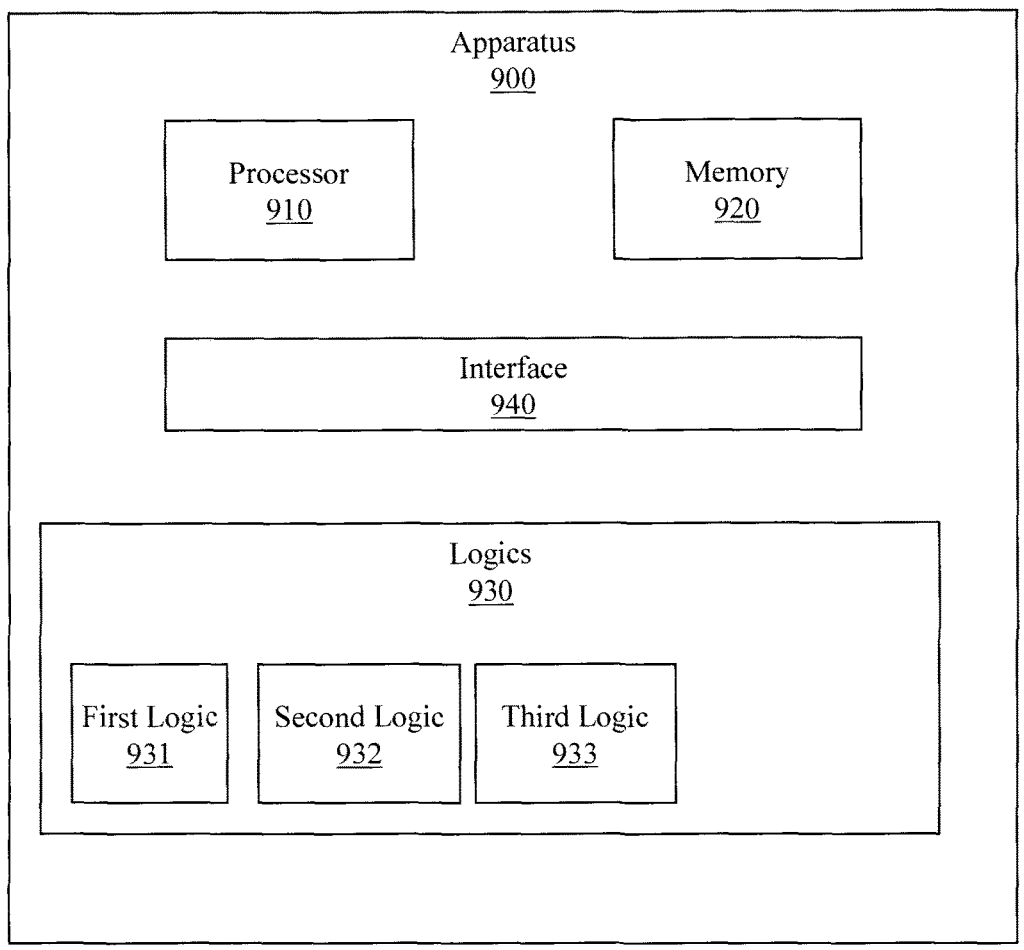
FIG. 9 illustrates an example apparatus associated with metadata peering.

FIG. 9 illustrates an apparatus 900 that supports metadata peering. Apparatus 900 includes a processor 910, a memory 920, and a set 930 of logics that is connected to the processor 910 and memory 920 by an interface 940. The memory 920 may store a data structure used by a file system running on the apparatus 900. The data structure may be used to access a file stored in shared secondary storage (e.g., the cloud). The data structure may be, for example, an improved inode. The file is managed by the file system and may be a shared file that can be managed or accessed by multiple file systems.

The set 930 of logics may include a first logic 931 that acquires first locating data associated with the file. The first locating data is local to the file system and is used by the file system for addressing the file. The first locating data may be, for example, a file name that conventionally would resolve to a length and offset associated with a storage location on a local storage device. In one embodiment, the first locating data may include a length and an offset associated with a data store local to the file system.

The apparatus 900 may also include a second logic 932 that acquires second locating data associated with the file. The second locating data is local to the shared secondary storage and is used by the shared secondary storage for addressing the file. The second locating data may be, for example, a combination of information that facilitates accessing the file wherever it may be stored on the shared secondary storage.

The apparatus 900 may also include a third logic 933 that stores an opaque value in the data structure. The opaque value relates the first locating data to the second locating data. The value is an "opaque" value because it may provide no direct visibility into the local namespace or address space associated with the device running the file system and may provide no direct visibility into a namespace or address space used by devices associated with the shared secondary storage. Instead, the opaque value may relate the two pieces or sets of information to redirect local file system accesses to shared secondary storage.

Figure 10:
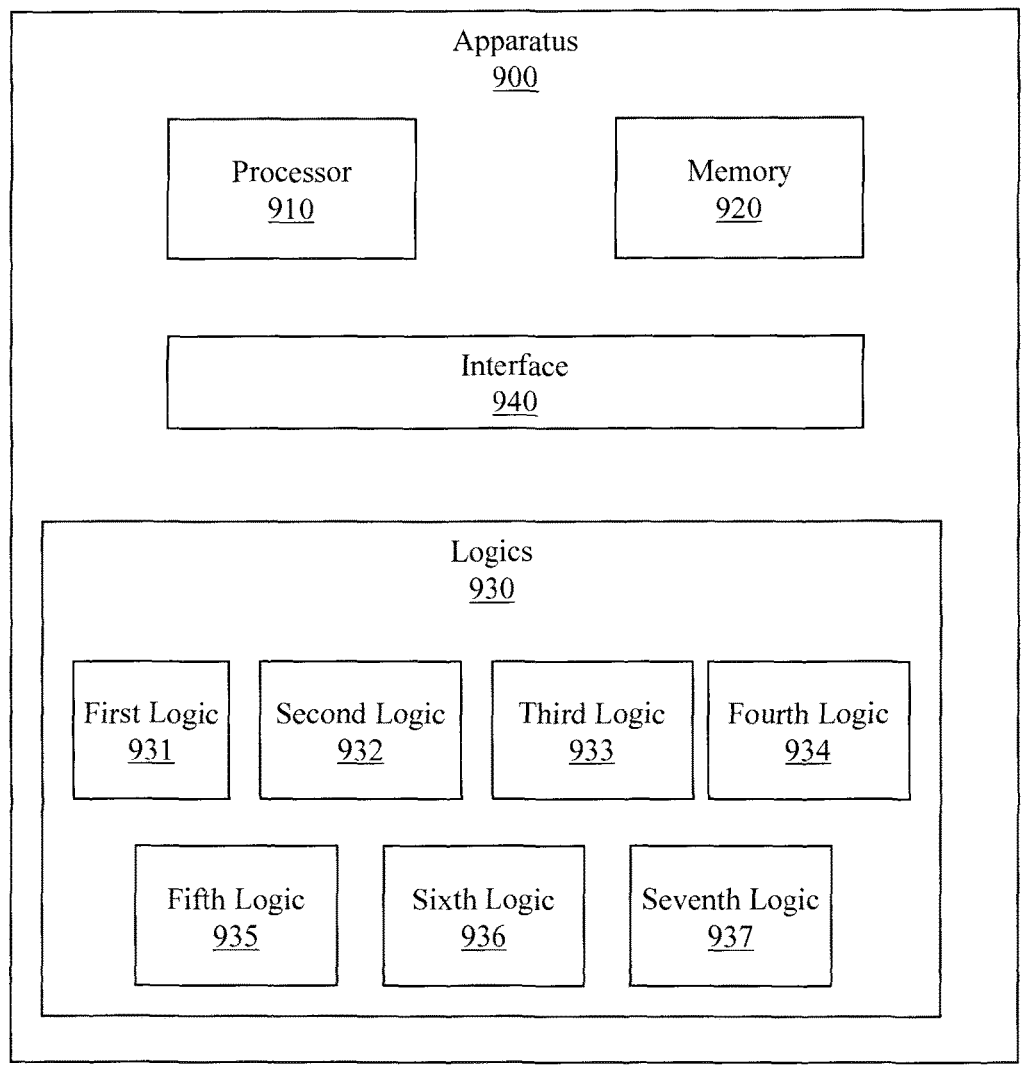
FIG. 10 illustrates an example apparatus associated with metadata peering.

FIG. 10 illustrates another embodiment of apparatus 900. This embodiment includes a fourth logic 934 that detects a request by the file system to access the file using the first locating data. The fourth logic 934 controls the apparatus 700 to retrieve the opaque value associated with the first locating data and to provide a request to the shared secondary storage. The request to the shared secondary storage includes the opaque value.

This embodiment of apparatus 900 also includes a fifth logic 935 that controls the apparatus 900 to provide at least a portion of the data structure to an external data store. In one embodiment, the fifth logic 935 controls the apparatus 900 to provide a transaction to the external data store. The transaction includes information about the request by the file system to access the file using the first locating data. The transaction may also include information about a result of the request to the shared secondary storage.

This embodiment of apparatus 900 also includes a sixth logic 936 that controls the apparatus 900 to rebuild a portion of the file system using data stored in the external data store. In one embodiment, controlling the apparatus 900 to rebuild the portion of the file system includes accessing a selected data structure in the external data store. The selected data structure is associated with a file to be rebuilt in the portion of the file system. Rebuilding the portion of the file system may also include initializing a rebuild data structure associated with the file to be rebuilt. The rebuild data structure is initialized using a first opaque value from the selected data structure. The first opaque value relates a first locating data associated with the file to be rebuilt to a second locating data associated with the file to be rebuilt. The first locating data is used by the file system to address the file to be rebuilt, and the second locating data is used by the secondary storage to address the file to be rebuilt. Controlling the apparatus 900 to rebuild the portion of the file system may also include accessing a selected transaction associated with the file to be rebuilt. The selected transaction is stored in the external data store and includes information about previous accesses to the file to be rebuilt. Rebuilding the portion of the file system may also include updating the rebuild data structure based, at least in part, on the selected transaction. For example, the rebuild data structure may be updated with a current first locating data associated with the file to be rebuilt or with a current opaque value.

This embodiment of apparatus 900 also includes a seventh logic 937 that controls the apparatus 900 to build a second file system using data stored in the external data store. In one embodiment, controlling the apparatus 900 to build the second file system includes accessing a selected data structure in the external data store. The selected data structure is associated with a selected file to be included in the second file system. Building the second file system may also include initializing a build data structure associated with the selected file. The build data structure is initialized using a first opaque value from the selected data structure. The first opaque value relates a first locating data associated with the selected file to a second locating data associated with the selected file. The first locating data is used by the second file system to address the selected file and the second locating data is used by the secondary storage to address the selected file. Building the second file system may also include accessing a selected transaction associated with the selected file. The selected transaction is stored in the external data store and includes information about previous accesses to the selected file. Building the second file system may also include selectively updating the build data structure based, at least in part, on the selected transaction.

More generally, the methods and apparatus described herein may be part of a system that includes a computer and a file system efficiency apparatus. The computer runs a file system that manages files. The file system efficiency apparatus maps an address used by the file system to address a file in a local namespace to an address used by a shared secondary storage. The indirection and mapping allows the file system to address files in the shared secondary storage in an unmodified native mode that uses addresses local to the computer.

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and other similar terms, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and other disks. Volatile media may include, for example, semiconductor memories, dynamic memory, and other memories. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a data structure (e.g. a list, a queue, a heap, a tree) a memory, a register, or other repository. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include, for example, a software controlled microprocessor, a discrete logic (e.g., ASIC), an analog circuit, a digital circuit, a programmed logic device, or a memory device containing instructions. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, or logical communications may be sent or received. An operable connection may include a physical interface, an electrical interface, or a data interface. An operable connection may include differing combinations of interfaces or connections sufficient to allow operable control. For example, two entities can be operably connected to communicate signals to each other directly or through one or more intermediate entities (e.g., processor, operating system, logic, software). Logical or physical communication channels can be used to create an operable connection.

"Signal", as used herein, includes but is not limited to, electrical signals, optical signals, analog signals, digital signals, data, computer instructions, processor instructions, messages, a bit, or a bit stream, that can be received, transmitted and/or detected.

"Software", as used herein, includes but is not limited to, one or more executable instructions that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, or programs including separate applications or code from dynamically linked libraries.

"User", as used herein, includes but is not limited to one or more persons, software, logics, applications, computers or other devices, or combinations of these.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
    a processor;
    a memory that stores a data structure used by a file system running on the apparatus to access a file stored in shared secondary storage, where the file is managed by the file system;
    a set of circuits; and
    an interface that connects the processor, the memory, and the set of circuits;
    the set of circuits comprising:
        a first circuit that acquires first locating data associated with the file, where the first locating data is local to the file system and where the first locating data is used by the file system for addressing the file;
        a second circuit that acquires second locating data associated with the file, where the second locating data is local to the shared secondary storage, and where the second locating data is used by the shared secondary storage for addressing the file,
        a third circuit that stores an opaque value in the data structure, where the opaque value relates the first locating data to the second locating data and relates two different addresses of the file system and the shared secondary storage as two disparate file systems, and wherein the opaque value enables an indirect arrival to the file in the shared secondary storage without providing a direct visibility to either of the two disparate file systems; and
        a fourth circuit that detects a request by the file system to access the file using the first locating data, where the fourth circuit is configured to control the apparatus to retrieve the opaque value associated with the first locating data and to provide a request to the shared secondary storage, where the request to the shared secondary storage includes the opaque value.

2. The apparatus of claim 1, where the first locating data comprises a length and an offset associated with a data store local to the file system.

3. The apparatus of claim 1, comprising a fifth circuit configured to control the apparatus to provide at least a portion of the data structure to an external data store.

4. The apparatus of claim 3, where the fifth circuit is configured to control the apparatus to provide a transaction to the external data store, where the transaction includes information about the request by the file system to access the file using the first locating data and where the transaction includes information about a result of the request to the shared secondary storage.

5. The apparatus of claim 4, comprising a sixth circuit configured to control the apparatus to rebuild a portion of the file system using data stored in the external data store.

6. The apparatus of claim 5, where controlling the apparatus to rebuild the portion of the file system comprises:
    accessing a selected data structure in the external data store, where the selected data structure is associated with a file to be rebuilt in the portion of the file system;
    initializing a rebuild data structure associated with the file to be rebuilt, where the rebuild data structure is initialized using a first opaque value from the selected data structure, where the first opaque value relates a first locating data associated with the file to be rebuilt to a second locating data associated with the file to be rebuilt, where the first locating data associated with the file to be rebuilt is used by the file system to address the file to be rebuilt, and where the second locating data associated with the file to be rebuilt is used by the secondary storage to address the file to be rebuilt;

accessing a selected transaction associated with the file to be rebuilt, where the selected transaction is stored in the external data store, and where the selected transaction includes information about previous accesses to the file to be rebuilt, and updating the rebuild data structure based, at least in part, on the selected transaction.

7. The apparatus of claim 6, comprising:
selectively updating the rebuild data structure with a current first locating data associated with the file to be rebuilt or with a current opaque value.

8. The apparatus of claim 4, comprising a seventh circuit configured to control the apparatus to build a second file system using data stored in the external data store.

9. The apparatus of claim 7, where controlling the apparatus to build the second file system comprises:
accessing a selected data structure in the external data store, where the selected data structure is associated with a selected file to be included in the second file system;
initializing a build data structure associated with the selected file, where the build data structure is initialized using a first opaque value from the selected data structure, where the first opaque value relates a first locating data associated with the selected file to a second locating data associated with the selected file, where the first locating data associated with the selected file is used by the second file system to address the selected file, and where the second locating data associated with the selected file is used by the secondary storage to address the selected file;
accessing a selected transaction associated with the selected file, where the selected transaction is stored in the external data store, and where the selected transaction includes information about previous accesses to the selected file, and
updating the build data structure based, at least in part, on the selected transaction.

10. The apparatus of claim 2, where the opaque value comprises a value that resolves to an actual address on a data storage device, the actual address comprising a length and an offset field.

11. The apparatus of claim 10, where each of the disparate file systems comprises an associated namespace, and includes access to a shared location of the shared secondary storage, where the file system comprises an associated local namespace and local view.

12. The apparatus of claim 11, where the shared secondary storage comprises a plurality of disk drives, a plurality of tape drives, a cloud based storage, or a plurality of other data stores comprising solid state devices, where a single copy of data is stored in the shared secondary storage with different references of the disparate file systems, respectively leading to the shared location of the shared secondary storage.

13. The apparatus of claim 12, where indirection information enables using the different references to access the file in the shared secondary storage even though the file system accesses the file using the local namespace identifier.

* * * * *